United States Patent
Veilleux, Jr. et al.

(10) Patent No.: US 9,303,563 B2
(45) Date of Patent: Apr. 5, 2016

(54) MODULATING ELECTRIC LIQUID METERING VALVE WITH FLOW SENSING

(71) Applicants: Leo J. Veilleux, Jr., Wethersfield, CT (US); Todd Haugsjaahabink, Springfield, MA (US)

(72) Inventors: Leo J. Veilleux, Jr., Wethersfield, CT (US); Todd Haugsjaahabink, Springfield, MA (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 787 days.

(21) Appl. No.: 13/654,645

(22) Filed: Oct. 18, 2012

(65) Prior Publication Data

US 2014/0109584 A1   Apr. 24, 2014

(51) Int. Cl.
| | |
|---|---|
| F02C 1/00 | (2006.01) |
| F02C 7/232 | (2006.01) |
| F23K 5/14 | (2006.01) |
| F23N 1/00 | (2006.01) |
| F23N 5/18 | (2006.01) |

(52) U.S. Cl.
CPC ............ *F02C 7/232* (2013.01); *F23K 5/147* (2013.01); *F23N 1/002* (2013.01); *F23N 2005/185* (2013.01); *F23N 2035/16* (2013.01); *F23N 2037/02* (2013.01)

(58) Field of Classification Search
CPC .......... F02C 7/232; F02C 9/263; F23N 1/002; F23N 2005/185; F23N 2035/16; F23K 5/147; G05D 7/0635
USPC ...................... 251/129.04; 137/554
See application file for complete search history.

(56) References Cited

U.S. PATENT DOCUMENTS

| | | | | |
|---|---|---|---|---|
| 3,331,388 A | * | 7/1967 | Evans ................... | F02D 29/00 137/486 |
| 3,356,106 A | * | 12/1967 | Riseman ................ | B01L 3/567 137/614.17 |
| 4,616,481 A | * | 10/1986 | Melchior .............. | F02B 37/166 60/606 |
| 4,926,903 A | * | 5/1990 | Kawai .................. | G01F 1/26 137/486 |
| 5,018,354 A | | 5/1991 | Melchior et al. | |
| 5,152,309 A | * | 10/1992 | Twerdochlib ........ | G05D 7/0635 137/486 |
| 5,242,117 A | | 9/1993 | D'Agostino et al. | |
| 6,279,870 B1 | * | 8/2001 | Welz, Jr. ............. | F16K 27/0218 251/129.04 |
| 2003/0056490 A1 | * | 3/2003 | Anderson ............. | F02C 3/20 60/39.281 |
| 2012/0156058 A1 | | 6/2012 | Achor | |

FOREIGN PATENT DOCUMENTS

GB            585029 A        1/1947

OTHER PUBLICATIONS

GB Search Report for GB Application No. 1317858.7, dated May 21, 2014, pp. 1-3.

* cited by examiner

*Primary Examiner* — Charles Freay
(74) *Attorney, Agent, or Firm* — Cantor Colburn LLP

(57) ABSTRACT

A fluid flow valve includes a movable valve piston positioned in a valve body, the valve piston configured to flow a fluid therethrough. A metering window is interactive with the movable valve piston to meter flow through the movable valve piston. A flow meter is positioned at the valve piston to measure a flow rate of fluid through the valve piston. A valve controller is operable connected to the flow meter and the movable valve piston to control position of the valve piston based on flow rate measured at the flow meter.

17 Claims, 1 Drawing Sheet

MODULATING ELECTRIC LIQUID METERING VALVE WITH FLOW SENSING

BACKGROUND OF THE INVENTION

The subject matter disclosed herein relates to valves. More specifically, the subject matter disclosed herein relates to control of flow through fuel delivery valves for combustors.

Engines, for example, gas turbines include combustors at which a fuel, typically a liquid, is injected into a combustion zone and combusted with air to drive a turbine. To provide fuel flow to the combustion zone, a centralized fuel distribution system is typically utilized to distribute fuel to a plurality of fuel nozzles arrayed around the combustor. The fuel is injected into the combustion zone by the nozzles. The centralized distribution system includes shutoff and metering capabilities to meter or to stop fuel flow to either all of the nozzles or specific groups of fuel nozzles, such as primary and/or secondary groups of fuel nozzles.

An ever increasing demand is being placed on achieving higher degrees of operating efficiency of the engines, as well as an increasing demand to tune acoustic signatures, reduce emissions and reduce thermal signatures of the engines. It is becoming increasingly difficult to meet these objectives with the present fuel flow management and distribution schemes in the combustor.

BRIEF DESCRIPTION OF THE INVENTION

In one embodiment, a fluid flow valve includes a movable valve piston positioned in a valve body, the valve piston configured to flow a fluid therethrough. A metering window is interactive with the movable valve piston to meter flow through the movable valve piston. A flow meter is positioned at the valve piston to measure a flow rate of fluid through the valve piston. A valve controller is operable connected to the flow meter and the movable valve piston to control position of the valve piston based on flow rate measured at the flow meter.

In another embodiment, a combustor includes a combustor shell and a plurality of fuel nozzles to inject a flow of fuel into a combustion zone of the combustor. The plurality of fuel nozzles are arranged into a plurality of fuel circuits. Each fuel circuit includes at least one fuel flow valve upstream of the plurality of fuel nozzles. The fuel flow valve includes a movable valve piston located in a valve body. The valve piston is configured to flow a fuel therethrough. A metering window is interactive with the movable valve piston to meter flow through the movable valve piston. A flow meter is located at the valve piston to measure a flow rate of fuel through the valve piston. A valve controller is operably connected to the flow meter and the movable valve piston to control position of the valve piston based on flow rate measured at the flow meter.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

Figure 1:
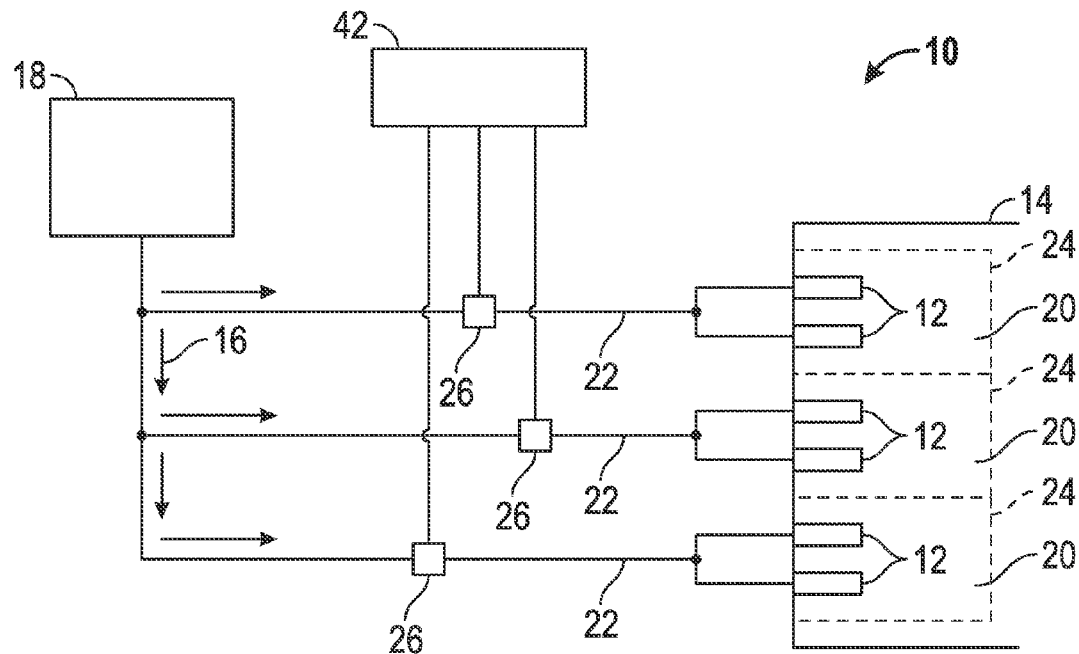
FIG. 1 is a schematic view of a combustor and fuel system.

The detailed description explains embodiments of the invention, together with advantages and features, by way of example with reference to the drawing.

DETAILED DESCRIPTION OF THE INVENTION

Shown in FIG. 1 is a combustor 10 for, for example, for a gas turbine. The combustor 10 includes a plurality of fuel nozzles 12 arrayed around a combustor shell 14. The fuel nozzles 12 direct a flow of fuel 16 from a fuel source 18 into a combustion zone 20 where it is combusted. In some embodiments, the nozzles 12 are grouped into a plurality of circuits 22, with each circuit 22 servicing a zone 24 or portion of a zone 24 of the combustor 10. Each circuit 22 includes at least one metering and shutoff valve 26 located upstream of the fuel nozzles 12 to monitor and regulate fuel flow to the fuel nozzles 12 of the circuit 22. The valves 26 are operably connected to an engine control system 42.

Figure 2:
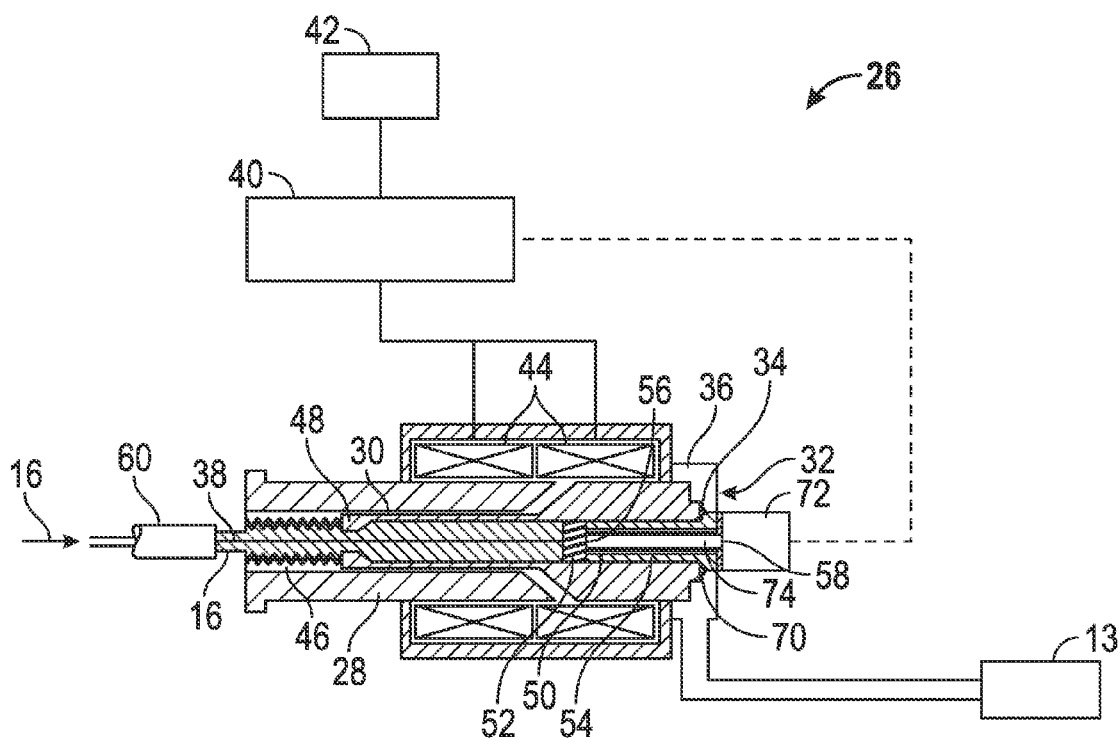
FIG. 2 is a schematic view of an embodiment of fuel flow valve for a combustor.

Referring to FIG. 2, the valve 26 includes a fixed valve housing 28 and a movable valve piston 30 located in the valve housing 28 configured to allow the flow of fuel 16 therethrough. In the valve 26, the valve piston 30 is moveable generally along a central axis 38 of the valve 26. The valve piston 30 is interactive with a metering window 32 of the circuit 22 (shown in FIG. 1) such that when a piston end 34 is moved away from a metering wall 36 of the metering window 32, the flow of fuel 16 through the valve piston 30 and toward the fuel nozzle 12 is increased. Conversely, when the piston end 34 is moved toward the metering wall 36 of the metering window 32, the flow of fuel 16 through the valve piston 30 and toward the fuel nozzle 12 is decreased. The valve 26 includes a valve controller 40 to control movement of the valve piston 30 in the valve housing 28. The valve controller 40, in turn, is operably connected to the engine control system 42, for example, a full authority digital engine control (FADEC) 42. The valve controller 40 receives fuel flow commands from the FADEC 42 and manipulates position of the valve piston 30 accordingly.

In some embodiments, the valve piston 30 position is driven by one or more electrical coils 44. When the coils 44 are energized, the valve position 30 moves away from the metering wall 36 allowing flow of fuel 16 through the valve piston 30. The rate of flow of fuel 16 is increased or decreased by increasing or decreasing a flow of electrical current through the coils 44. In some embodiments, the valve 26 includes a biasing member to bias the valve piston 30 toward a closed position against the metering wall 36. As shown, the biasing member may be a bellows 46 located at a base end 48 of the valve piston 30, and having one end fixed to the valve housing 28. When the coils 44 are deenergized, the bellows 46 expands along the central axis 38 urging the valve piston 30 into contact with the metering wall 36. The bellows 46 also eliminates the need for a dynamic seal for preventing leakage of fuel 16. With no dynamic seal, a valve motor can be smaller and the valve 26 is easier to control. In some embodiments, a piston seal 70 is located at the valve piston 30 to seal to the metering wall 36 when the valve 26 is in a closed position. The piston seal 70 could also be located on the metering wall 36. In some embodiments, the operation of the valve 26 can be reversed if desired such that the biasing member sends the valve 26 to the open position and the coils 44 drive the valve 26 to the closed position.

The valve 26 further includes a flow meter 50 located in the valve piston 30 to continuously measure flow rate of the fuel 16 through the valve piston 30. In the embodiment of FIG. 2, the flow meter 50 comprises a bladed disk 52 located in the valve piston 30. The bladed disk 52 is connected to a first end 56 of a twist-shaft 54, which is in turn fixed at a second end 58. As fuel 16 flows past the bladed disk 52, it rotates in the valve piston 30 thus imparting an angle of twist on the twist shaft 54 measured by a resolver 72 or the like, which is connected to the bladed disk 52 by a shaft 74. The angle of twist on the twist shaft 54 is compared to a known flow rate per degree of twist stored in the valve controller 40 for that particular valve 26. Alternatively, in place of the resolver 72, a strain gage or the like can be used to measure the strain of the twist shaft 54 and thus related fuel flow. The controller 40 calculates the actual flow of fuel 16 through the valve 26 and relays the flow rate to the FADEC 42 for any adjustments to the valve 26 position, if necessary. To increase accuracy of the flow rate determination, a densometer 60 is located at the valve 26 to provide real time fuel density measurements to the controller 40 to be included in the flow rate calculation.

The valves 26 allow for drainage of fuel 16 from one or more of the circuits 22 when combustor 10 operation is stopped. To drain the circuits 22, a main fuel pump (not shown) is stopped to stop flow of fuel 16, and the valves 26 are deenergized and thus closed. Valves 26 for the circuits 22 to be drained are then energized and opened. The main fuel pump is then spun backwards thus pulling fuel 16 from the circuits and back to the fuel source 18. The valves 26 allow for drainage of the circuits 22 back into the fuel source 18 rather than, as in a conventional fuel system, into a separate drainage fuel tank via additional valves and piping.

Having valves 26 located at each circuit 22 rather than one central fuel flow valve as in a typical fuel system allows for increased operational control over the flow of fuel 16 to each circuit 22 of the combustor 10. The flow meter 50 provides measurement of actual flow of fuel 16 through each valve 26 such that the FADEC 42 can more accurately determine and control fuel 16 flow to the combustor 10. Further, individual valves 26 for each circuit allows for tuning of flow of fuel 16 to each circuit 22 so that, for example, flow of fuel 16 can be balanced, unbalanced, or otherwise tuned to mitigate issues related to acoustics, emissions, or the like.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while the various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A fluid flow valve comprising:
   a movable valve piston reciprocally disposed in a valve housing, the valve piston including a passage configured to flow a fluid therethrough;
   a metering window interactive with the movable valve piston to meter flow through the valve piston;
   a flow meter disposed in the passage to measure a flow rate of the fluid through the valve piston; and
   a valve controller operably connected to the flow meter and the movable valve piston to control a position of the valve piston based on the measured flow rate.

2. The fluid flow valve of claim 1, wherein the flow meter comprises a bladed disk secured to a first end of a twist shaft, with a second end of the twist shaft fixed, an angle of twist of the flow meter or a strain of the twist shaft indicative of a rate of fluid flow through the valve piston.

3. The fluid flow valve of claim 2, wherein the angle of twist or the strain of the twist shaft is compared to a known relationship of flow rate versus degree of twist or strain stored in the valve controller to determine the fluid flow rate through the valve piston.

4. The fluid flow valve of claim 1, further comprising at least one electrical coil operably connected to the valve piston and disposed at the valve housing, that when energized urges movement of the valve piston from a closed position toward an open position.

5. The fluid flow valve of claim 1, further comprising a biasing member to bias the valve piston to a closed or an open position as selected.

6. The fluid flow valve of claim 5, wherein the biasing member is a bellows secured to the valve piston.

7. The fluid flow valve of claim 1, further comprising a densometer operably connected to the valve controller to provide fluid flow density measurements to the valve controller.

8. The fluid flow valve of claim 1, where the fluid flow is a liquid fuel.

9. A combustor comprising:
   a combustor shell; and
   a plurality of fuel nozzles to inject a flow of fuel into a combustion zone of the combustor, the plurality of fuel nozzles arranged in a plurality of fuel circuits, each fuel circuit including at least one fuel flow valve upstream of the plurality of fuel nozzles including:
      a movable valve piston reciprocally disposed in a valve housing, the valve piston including a passage configured to flow a fuel therethrough;
      a metering window interactive with the movable valve piston to meter flow through the movable valve piston;
      a flow meter disposed in the passage to measure a flow rate of fuel through the valve piston; and
      a valve controller operably connected to the flow meter and the movable valve piston to control a position of the valve piston based on flow rate measured at the flow meter.

10. The combustor of claim 9, wherein the flow meter comprises a bladed disk secured to a first end of a twist shaft, with a second end of the twist shaft fixed, an angle of twist of the flow meter indicative of a rate of fuel flow through the valve piston.

11. The combustor of claim 10, wherein the angle of twist is compared to a known fuel flow rate per degree of twist stored in the valve controller to determine the rate of fuel flow through the valve piston.

12. The combustor of claim 9, further comprising at least one electrical coil operably connected to the valve piston and disposed at the valve housing, that when energized urges movement of the valve piston from a closed position toward an open position.

13. The combustor of claim 9, further comprising a biasing member to bias the valve piston to a closed position.

14. The combustor of claim 13, wherein the biasing member is a bellows secured to the valve piston.

15. The combustor of claim 9, further comprising a densometer operably connected to the valve controller to provide fuel flow density measurements to the valve controller.

16. The combustor of claim 9, wherein the fuel flow valves are configured to provide balanced or unbalanced flow of fuel as selected to the plurality of fuel circuits.

17. The combustor of claim 9, wherein each valve controller is operably connected to an engine control system to provide fuel flow rate data thereto and receive fuel flow commands therefrom.

\* \* \* \* \*